US009154386B2

(12) United States Patent
Johnson et al.

(10) Patent No.: US 9,154,386 B2
(45) Date of Patent: *Oct. 6, 2015

(54) USING METADATA ANALYSIS FOR MONITORING, ALERTING, AND REMEDIATION

(75) Inventors: William D. Johnson, Allen, TX (US); Darel R. Stokes, Allen, TX (US)

(73) Assignee: TDI Technologies, Inc., Plano, TX (US)

( * ) Notice: Subject to any disclaimer, the term of this patent is extended or adjusted under 35 U.S.C. 154(b) by 1430 days.

This patent is subject to a terminal disclaimer.

(21) Appl. No.: 12/134,642

(22) Filed: Jun. 6, 2008

(65) Prior Publication Data

US 2009/0307273 A1 Dec. 10, 2009

(51) Int. Cl.
  *G06F 21/32* (2013.01)
  *H04L 12/24* (2006.01)
  *G06F 17/30* (2006.01)
  *G06F 17/24* (2006.01)
  *G06F 9/455* (2006.01)
  *G06F 11/30* (2006.01)
  (Continued)

(52) U.S. Cl.
  CPC ........ *H04L 41/5009* (2013.01); *G06F 9/45533* (2013.01); *G06F 11/3086* (2013.01); *G06F 17/241* (2013.01); *G06F 17/301* (2013.01); *G06F 17/30722* (2013.01); *G06F 17/30743* (2013.01); *G06F 17/30784* (2013.01); *G06F 17/30997* (2013.01); *G06F 21/32* (2013.01); *G06F 21/55* (2013.01); *H04L 63/1425* (2013.01); *G06F 11/3476* (2013.01); *H04L 43/045* (2013.01); *H04L 43/067* (2013.01)

(58) Field of Classification Search
  CPC ..................... G06F 17/30743; G06F 17/30784; G06F 21/32; G06F 11/3086; G06F 17/301; G06F 17/30722; G06F 17/30997; G06F 9/45533; G06F 17/241

USPC ........ 707/602, 609, 682, 694, 776; 726/22–30; 709/203–204, 224; 713/176

See application file for complete search history.

(56) References Cited

U.S. PATENT DOCUMENTS 5,740,432 A  4/1998  Mastors ................. 395/618
5,819,094 A  10/1998  Sato et al. ................ 395/704
(Continued)

OTHER PUBLICATIONS

Johnson et al., *System and Method for Monitoring and Securing a Baseboard Management Controller*, U.S. Appl. No. 12/102,605, filed Apr. 14, 2008.

(Continued)

*Primary Examiner* — Srirama Channavajjala
(74) *Attorney, Agent, or Firm* — Baker Botts L.L.P.

(57) ABSTRACT

In certain embodiments, a method for monitoring, alerting and remediation of systems is provided. The method provides for receiving data from one or more data sources and logging the data. A first metadata fingerprint is created for a particular data source. The first metadata fingerprint is indicative of a first quantity of data output for the particular data source. A second metadata fingerprint is created for the same data source. The second metadata fingerprint is indicative of a second quantity of data output for the data source. The second metadata fingerprint is created from data received at a different point in time from the first metadata fingerprint. The first metadata fingerprint is compared with the second metadata fingerprint associated with the particular data source. An alert is generated when the comparison indicates that the first metadata fingerprint does not correspond within a specified tolerance to the second metadata fingerprint.

22 Claims, 4 Drawing Sheets

(51) Int. Cl.
*G06F 21/55* (2013.01)
*H04L 29/06* (2006.01)
*G06F 11/34* (2006.01)
*H04L 12/26* (2006.01)

(56) References Cited

U.S. PATENT DOCUMENTS

| | | | |
|---|---|---|---|
| 5,832,518 A | 11/1998 | Mastors | 707/202 |
| 6,092,087 A | 7/2000 | Mastors | 707/202 |
| 6,243,838 B1 | 6/2001 | Liu et al. | 714/57 |
| 6,289,379 B1 | 9/2001 | Urano et al. | 709/223 |
| 6,434,616 B2 | 8/2002 | Urano et al. | 709/224 |
| 6,591,224 B1* | 7/2003 | Sullivan et al. | 702/179 |
| 6,795,868 B1* | 9/2004 | Dingman et al. | 709/246 |
| 6,909,708 B1 | 6/2005 | Krishnaswamy | 370/352 |
| 7,039,224 B2* | 5/2006 | Hamid et al. | 382/124 |
| 7,363,359 B1 | 4/2008 | Tripathy | 709/223 |
| 2002/0162017 A1 | 10/2002 | Sorkin et al. | 713/201 |
| 2002/0168082 A1* | 11/2002 | Razdan | 382/100 |
| 2002/0181749 A1* | 12/2002 | Matsumoto et al. | 382/125 |
| 2002/0184366 A1 | 12/2002 | Kimoto et al. | 709/224 |
| 2002/0184570 A1* | 12/2002 | Etgen | 714/42 |
| 2003/0061490 A1* | 3/2003 | Abajian | 713/176 |
| 2005/0108631 A1* | 5/2005 | Amorin et al. | 715/513 |
| 2005/0138483 A1 | 6/2005 | Hatonen et al. | 714/45 |
| 2005/0154977 A1 | 7/2005 | Abigail | 715/513 |
| 2005/0246552 A1 | 11/2005 | Bade et al. | |
| 2005/0267919 A1 | 12/2005 | Pivar et al. | |
| 2006/0040711 A1 | 2/2006 | Whistler | 455/566 |
| 2006/0064523 A1* | 3/2006 | Moriki et al. | 710/62 |
| 2006/0085465 A1* | 4/2006 | Nori et al. | 707/101 |
| 2006/0150153 A1* | 7/2006 | Altman | 717/116 |
| 2006/0184498 A1 | 8/2006 | Meyer et al. | 707/1 |
| 2006/0218204 A1 | 9/2006 | Ofer et al. | 707/201 |
| 2006/0245625 A1 | 11/2006 | Tichelaar et al. | |
| 2006/0248165 A1 | 11/2006 | Sridhar et al. | 709/218 |
| 2006/0259968 A1* | 11/2006 | Nakakoji et al. | 726/22 |
| 2007/0028244 A1* | 2/2007 | Landis et al. | 718/108 |
| 2007/0156698 A1 | 7/2007 | Gebhart et al. | 707/10 |
| 2007/0192329 A1 | 8/2007 | Croft | 707/10 |
| 2007/0266433 A1 | 11/2007 | Moore | |
| 2007/0282921 A1 | 12/2007 | Atluri et al. | 707/202 |
| 2007/0283194 A1 | 12/2007 | Villella et al. | 714/57 |
| 2008/0095339 A1 | 4/2008 | Elliott | 379/93.01 |

OTHER PUBLICATIONS

PCT Notification of Transmittal of the International Search Report and the Written Opinion of the International Searching Authority, or the Declaration mailed May 20, 2009 regarding PCT/US09/40171 filed Apr. 10, 2009.

Office Action issued by the Canadian Intellectual Property Office for U.S. Pat. No. 2,726,766; Owner: Tecsys Development, Inc., Nov. 13, 2013.

PCT Notification of Transmittal of the International Search Report and the Written Opinion of the International Searching Authority, or the Declaration for International Application No. PCT/US09/38919; Applicant: TECsys Development, Inc.; International Filing Date Mar. 31, 2009.

* cited by examiner

USING METADATA ANALYSIS FOR MONITORING, ALERTING, AND REMEDIATION

TECHNICAL FIELD

The present invention relates generally to data analysis, and more particularly to using metadata analysis for monitoring, alerting and remediation of systems.

BACKGROUND

Information technology managers often must monitor and manage an information technology architecture consisting of a large number of individual components such as, routers, firewalls, servers, and personal computers for failures, security breaches, and network utilization. These individual components often generate status messages about their current state of operation that are stored in log files.

SUMMARY

In particular embodiments, a method for monitoring, alerting and remediation of systems is provided. The method provides for receiving data from one or more data sources and logging the data. A first metadata fingerprint is created for a particular data source. The first metadata fingerprint is indicative of a first quantity of data output for the particular data source. A second metadata fingerprint is created for the same data source. The second metadata fingerprint is indicative of a second quantity of data output for the data source. The second metadata fingerprint is created from data received at a different point in time from the first metadata fingerprint. The first metadata fingerprint is compared with the second metadata fingerprint associated with the particular data source. An alert is generated when the comparison indicates that the first metadata fingerprint does not correspond within a specified tolerance to the second metadata fingerprint.

In particular embodiments, a method for monitoring, alerting and remediation of virtual machines is provided. The method provides for receiving data from a first virtual machine and logging the received data. A first metadata fingerprint is created for the first virtual machine. The first metadata fingerprint is indicative of a first quantity of data output for the first virtual machine. A second metadata fingerprint is created for a data source. The second metadata fingerprint is indicative of a second quantity of data output for the data source. The first metadata fingerprint is compared with the second metadata fingerprint associated with the particular data source. An alert is generated when the comparison indicates that the first metadata fingerprint does not correspond within a specified tolerance to the second metadata fingerprint.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DETAILED DESCRIPTION OF EXAMPLE EMBODIMENTS

Figure 1:
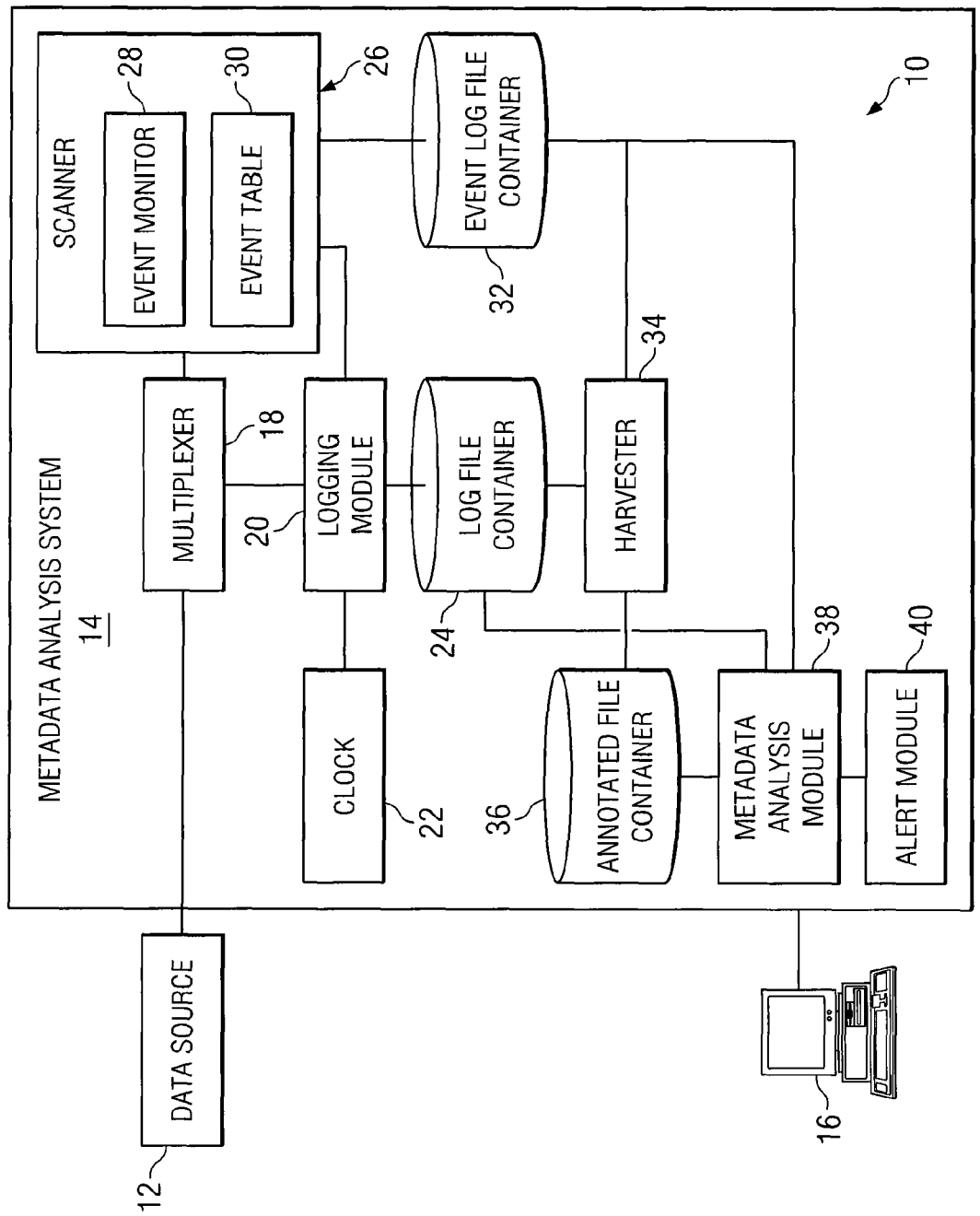
FIG. 1 is a block diagram illustrating an example system for using metadata analysis monitoring, alerting and remediation of systems.

FIG. 1 is a block diagram illustrating example system 10 for using metadata analysis for monitoring, alerting, and remediation of systems. In the illustrated example, system 10 includes one or more data sources 12, metadata analysis system 14, and user system 16. Metadata analysis system 14 may include a multiplexer 18, a logging module 20, a scanner 26, a harvester 34, and a metadata analysis module 38. Illustrated system 10 also includes data storage modules 24, 32, 36 for storage of various types of log files. User system 16 may include a graphical user interface (GUI). Although this particular implementation of system 10 is illustrated and primarily described, the present invention contemplates any suitable implementation of system 10 according to particular needs.

In particular embodiments, system 10 may provide a system for using metadata analysis for monitoring, alerting, and remediation of systems. System 10 may use metadata, defined as data about data, to analyze data streams for security events. In other embodiments, system 10 may use metadata to verify proper virtualization of a physical system or proper transfer of a hypervisor from one virtual system to another. Using metadata analysis for monitoring, alerting, and remediation may provide certain advantages. In particular, system administrators often expect a system to perform similarly between days. Therefore, the content of the data may by less important than the amount or type of data received. For example, metadata analysis may be concerned with the amount of data such as the number of bytes received, the number of events detected, or the number of records recorded. This may reduce computational and resource demands in security monitoring applications by reducing the need to analyze the content of received data. Other advantages may include easier verification of a successful virtualization of physical machines or a successful configuration of a warm/hot backup system.

In particular embodiments, data source 12 may be components, systems, and/or network elements that an information technology manager may be monitoring. Although generally referred to in the singular, any number of suitable components, systems, and/or network elements may be considered data source 12. These include computer systems that may be running on a MICROSOFT NET PLATFORM, APACHE SERVER, UNIX based operating systems, SUN MICROSYSTEMS JAVA PLATFORM, or any other suitable operating system. Other types of data source 12 include hardware based systems including switches, routers, storage arrays, environmental monitoring systems, medical devices, and any other type of device that is capable of transmitting a stream of data either autonomously or as a result of a request. Additionally, data source 12 may include applications such as a keystroke logger, login monitor, other software applications, or human interfaces that are a part of any system component. Data source 12 may include virtualized systems operating on large mainframe systems.

In particular embodiments, user system 16 may be a computing system described with respect to metadata analysis system 14 below and include one or more input/output devices that allow user to interface with metadata analysis system 14. In a particular embodiment, user system 16 includes a display device with a GUI that may allow a user to configure event table 30 with predefined patterns or data signatures for events, to configure how a notification is sent, and/or to interface with metadata analysis system 14. In some embodiments, GUI may include software that is able to obtain log files over a network and display and edit the log files. In a particular embodiment, user system 16 may connect to metadata analysis system 14 via an HTTP address and request information regarding log files, metadata fingerprints, and events.

In particular embodiments, metadata analysis system 14 may include one or more general-purpose personal computers (PCs), Macintoshes, workstations, Unix-based computers, server computers, or any other suitable devices. In short, metadata analysis system 14 may be formed using suitable combinations of software, firmware, hardware, and any other suitable components. Metadata analysis system 14 may be a single computing device or any suitable number of computing devices. For example, metadata analysis system 14 may be formed from a number of computers arranged in a computing pool.

Metadata analysis system 14 may be coupled to data source 12 by any appropriate means including, network connections such as, universal serial bus (USB), Ethernet, FIREWIRE, and/or 802.11 connections. Metadata analysis system 14 may receive information (such as voice, video, or data) from data source 12 in any suitable format such as IP packets, Frame Relay frames, Asynchronous Transfer Mode (ATM) cells, or other packet format.

In particular embodiments, multiplexer 18 may be a any suitable combination of logic encoded on a tangible computer-readable medium, hardware, or firmware. Multiplexer 18 is operable to receive data from data source 12 and any additional data source 12 that may be coupled to multiplexer 18 and combine the data from all data sources 12 into a single stream which is passed onto both scanner 26 and logging module 20.

Logging module 20 is operable to receive data from the multiplexer. Logging module 20 may be implemented via any suitable combination of hardware, logic encoded on a tangible computer-readable medium, or firmware. Coupled to logging module 20 may be clock 22. Logging module is operable to receive data from multiplexer 18, scanner 26, and access log file container 24. In particular embodiments, logging module 20 may access clock to provide an independent time stamp to received data from multiplexer 18 and/or scanner 26.

Logging module 20 may be operable to cause the storage of the received data in log file container 24 in the form of records. Individual records may be delineated using natural terminators from the data as carriage returns, punctuation marks, or specific symbols. Alternatively, records may be delineated according to a specific amount of data, for example, each record may be a maximum of 380 bytes long when not terminated by a natural terminator.

Log file container 24 may be hard disk drives, flash memory drives, storage server farms, and other forms of computer readable tangible storage media. Log file container 24 may be in the form of external or internal devices coupled to logging module 20 via any suitable communication link. Log file container 24 may be local to or remote from other components of system 10. Log file container 24 may store information received from multiplexer 18 for data source 12.

Scanner 26 may be any suitable combination of logic encoded on a tangible computer-readable medium, firmware, or hardware operable to receive data from multiplexer 18. Scanner contains event module 28 and event table 30. Scanner 26 may be operably coupled to event log file container 32. Scanner 26 may be operable to receive data from multiplexer 18. Event module 28 and event table 30 may be implemented on logic encoded on a tangible computer-readable medium. Event log file container 32 may be implemented using the storage media described with respect to log file container 22. Event table 30 may contain event definitions. Event module 28 may be programmed to analyze the data received from multiplexer 18. Event module 28 may access event table 30 for event definitions in order to determine data patterns or keywords to detect that an event has occurred. Additionally, event module 28 may access clock 22 in order to provide time stamping for detected events. Event log file container 32 may store detected events from scanner 26. Scanner 26 may also be operably coupled to logging module 20. Data about detected events from scanner 26 may be transmitted to logging module 20 and stored by log file container 24. A time stamp from clock 22 may or may not be added to information stored in log file container 24.

Harvester 34 may be any suitable combination of logic encoded on a tangible computer-readable medium, firmware, or hardware operable to read and process data from log file container 24 and event log file container 32. Harvester 34 may also be operably coupled to annotated log file container 36. Annotated log file container 36 may be implemented using the storage media described with respect to log file container 22. Harvester 34 may be operable to determine whether the data in log file container 24 and event log file container 32 have changed. Harvester 34 may be user configurable to process data from a specific period of time from the log files. For example, harvester 34 may process data from a day ago, a week ago, or a month ago. Harvester may create annotated log files and store information in annotated log file container 36.

Metadata analysis module 38 may be any suitable combination of logic encoded on a tangible computer-readable medium, firmware, or hardware. Metadata analysis module 38 may be operably coupled to log file container 24, event log file container 32 and/or annotated log file container 36. Metadata analysis module 38 may be operable to create metadata fingerprints from the log files. Metadata analysis module 38 may analyze the metadata fingerprints to determine if the metadata fingerprint for a particular time period is within a specified tolerance of metadata fingerprints created for previous time periods. For example, metadata analysis module 38 may create a baseline metadata fingerprint. The baseline metadata fingerprint may be compared to a metadata fingerprint created using real time data received from data source 12. Metadata analysis module 38 may compare the baseline metadata fingerprint with the metadata fingerprint created using real time data to determine the variance between the two metadata fingerprints. The allowable variance, also referred to as tolerance, may be set to a number or percentage. For example tolerance may be set to allow variances of 2,500 bytes per second, 3 events per second, 10 records per second, or other value. Additionally, tolerance may be set to a number of standard deviations computed using statistical analysis of previous metadata fingerprints.

In particular embodiments, metadata analysis module 38 creates several types of metadata fingerprints. For example metadata analysis module may create a metadata fingerprint from a particular day's log file from log file container 24, event log file container 32, and/or annotated log file container 36. Metadata fingerprints are discussed in greater detail in relation to FIGS. 2A and 2B.

Metadata analysis module 38 may be coupled to alert module 40. Alert module 40 may be logic encoded on a tangible computer-readable medium, firmware, or hardware. Alert module 40 may comprise a web server or email server, which may or may not be part of a larger server system. Alert module 40 may be operable to receive alerts from metadata analysis module 38. Alert module 40 may transmit data to user system 16 regarding alerts and may cause user system 16 to display alerts. Alert module 40 may alternatively send an email to an information technology administrator that an alert has occurred or cause a popup window to appear on a web browser running on user system 16.

Metadata analysis system 14 and user system 16 may be part of the same system or operably coupled via any suitable communication link, such as a link like communication link 13. Additionally, although various components of metadata analysis system 14 are illustrated and described separately, the present disclosure contemplates combining these components or further separating these components.

In operation of system 10, data source 12 may be operably coupled to metadata analysis system 14. Metadata analysis system 14 receives data from data source 12. The data may be text displayed on a monitor attached to data source 12, error messages generated by data source 12, or any other type of data output. Multiplexer 18 receives the data and passes the data to logging module 20 and scanner 26.

Logging module 20 accesses clock 22 and time stamps the data before storing the time stamped data in log file container 24. Scanner 26 processes the data by analyzing for events using event monitor 28 and event table 30. If an event is found, scanner creates an event entry and accesses clock 22 to time stamp the event entry. The event entry is stored in event log file container 32. The event may also be stored in log file container 24. Logging module 20 and scanner 26 may process the same data at substantially the same time.

Harvester 34 determines if data from log file container 24 and/or event log file container 32 have changed. Harvester 34 also creates entries in annotated log file container 36. Examples of entries harvester 34 may create in annotated log file container 36 include, metadata information such as, records recorded to a particular point in time, events recorded at a particular point in time, and a location of events in log file container 24 that correspond with locations in event log file container 32. This annotation may provide for cross-references for entries between log files. Metadata analysis module 38 creates metadata fingerprints and analyzes the fingerprints for deviations from acceptable tolerances. If a deviation is found, metadata analysis module generates a notification that a deviation has occurred. Metadata analysis module 38 also generates entries in annotated log file container 36 that relate the deviation to locations in log file container 24 and event log file container 32, which will be discussed in further detail with regard to FIG. 2B. Alert module 40 receives notification that a deviation has occurred. Alert module 40 sends an alert to user system 16. The alert may contain information relating to the deviation as well as possible options for remediation or allow the alert to be cancelled.

Figure 2A:
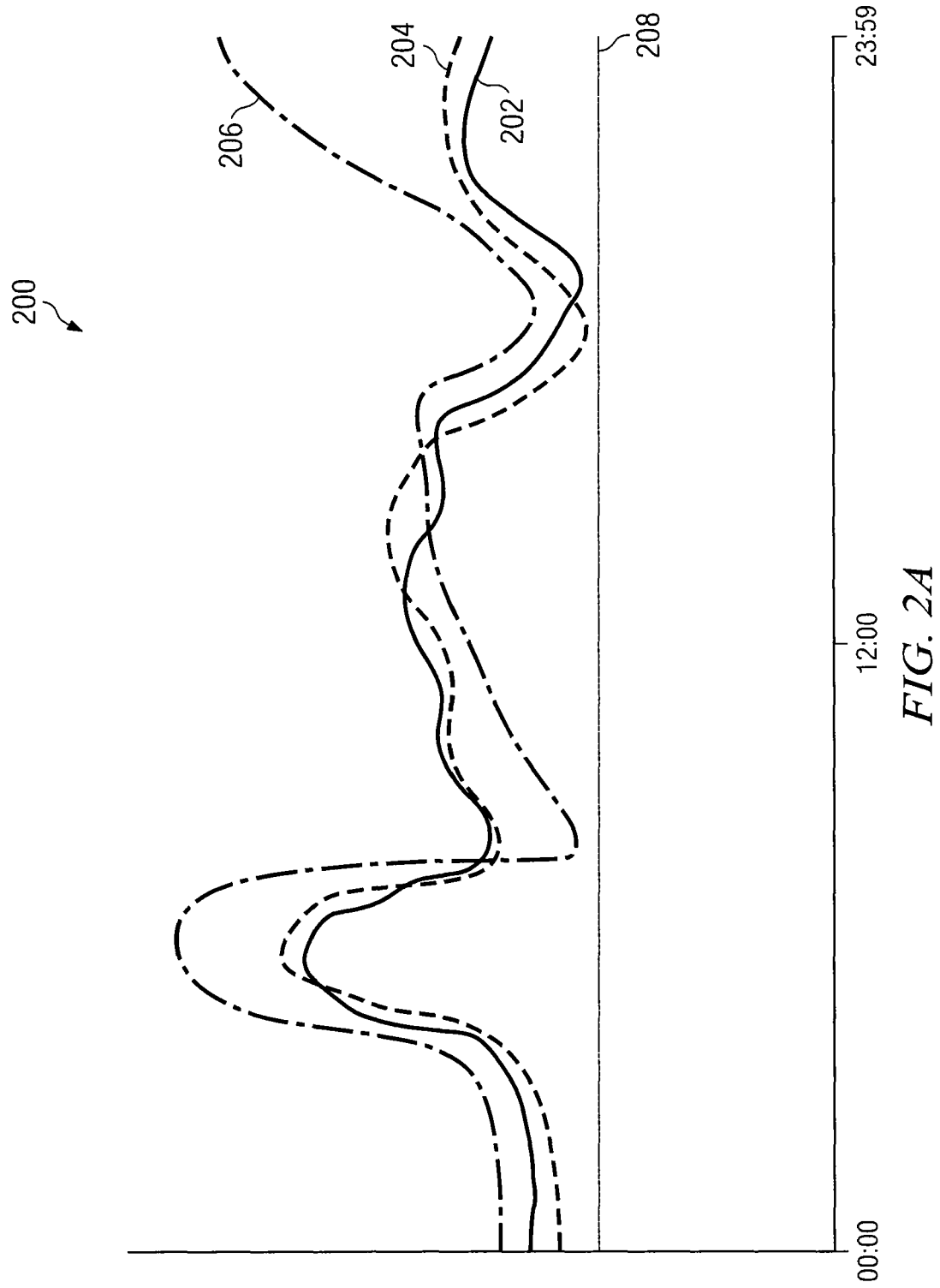
FIG. 2A is a graph illustrating example metadata fingerprints generated by the metadata analysis system of FIG. 1.
Figure 2B:
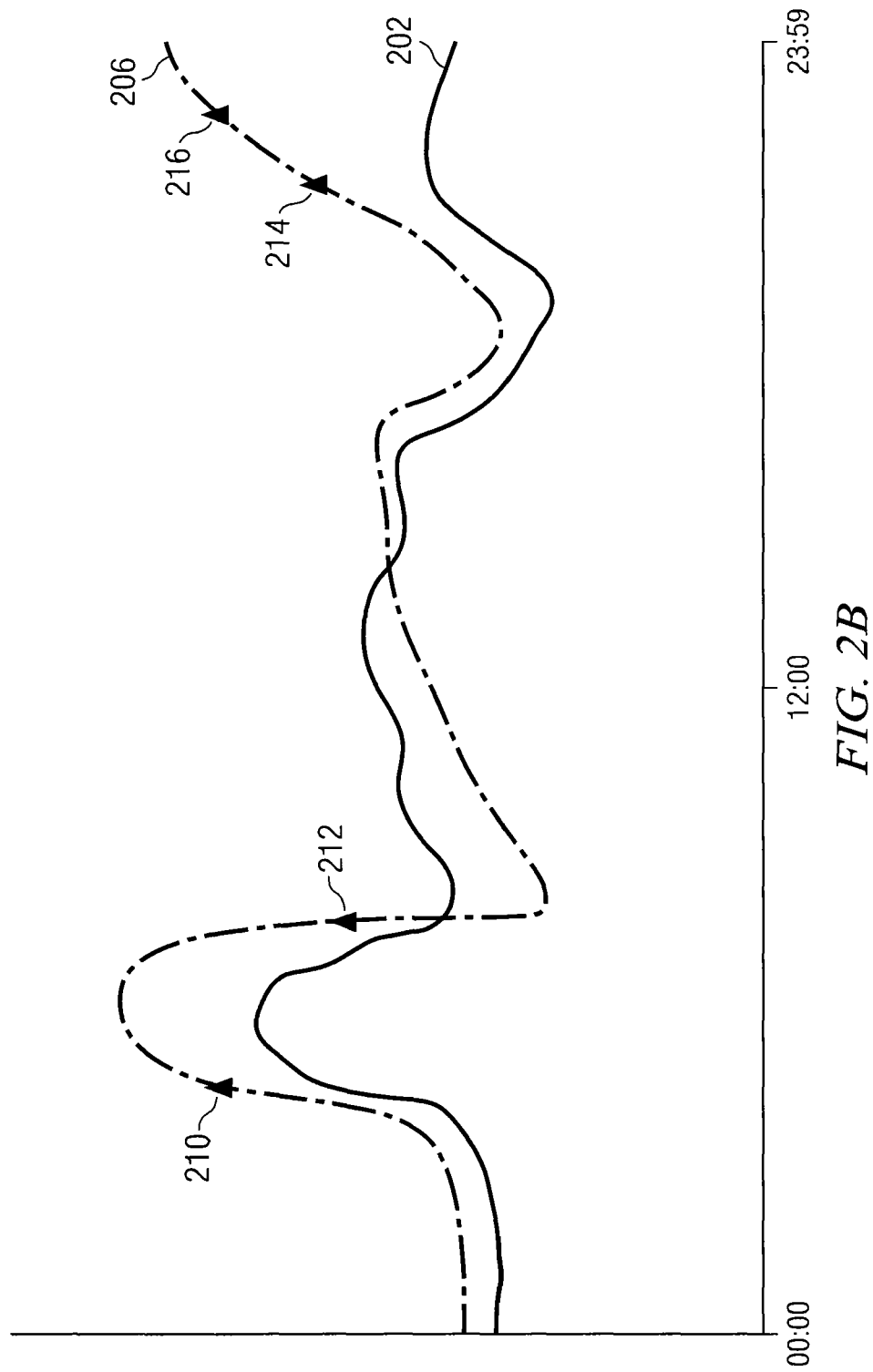
FIG. 2B is a graph illustrating particular points of interest from metadata fingerprints baseline and Tuesday from FIG. 2A.
Figure 3:
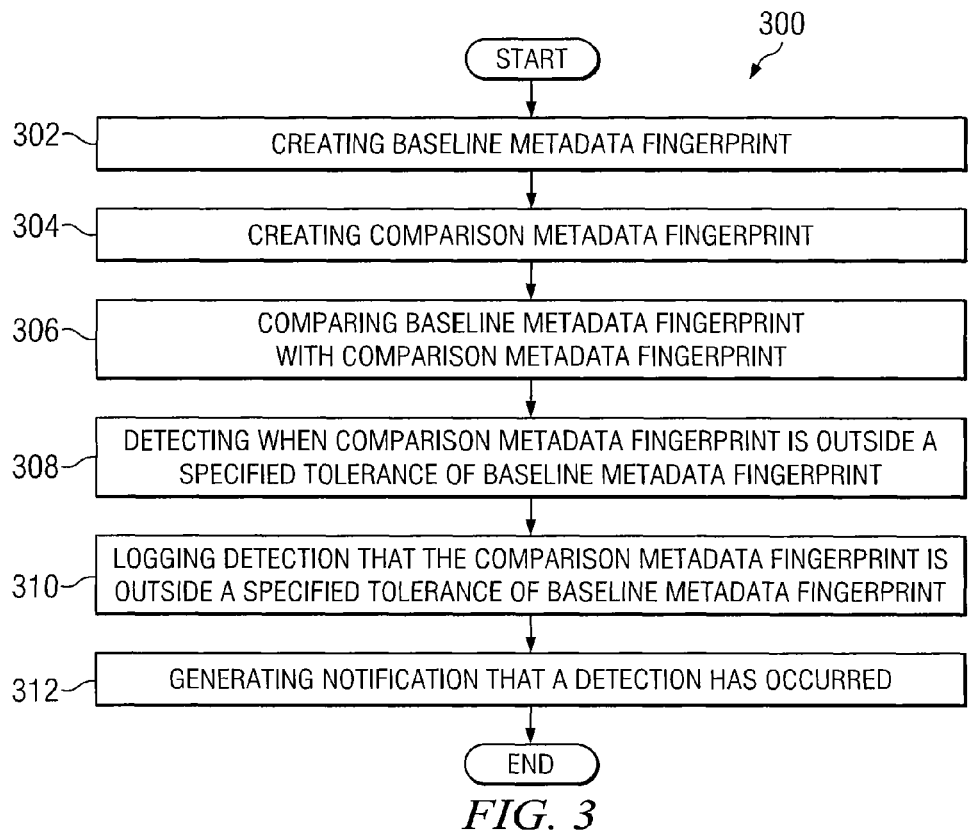
FIG. 3 is a flowchart illustrating an example method that may be carried out by the metadata analysis module in creating and analyzing metadata fingerprints.
Figure 4:
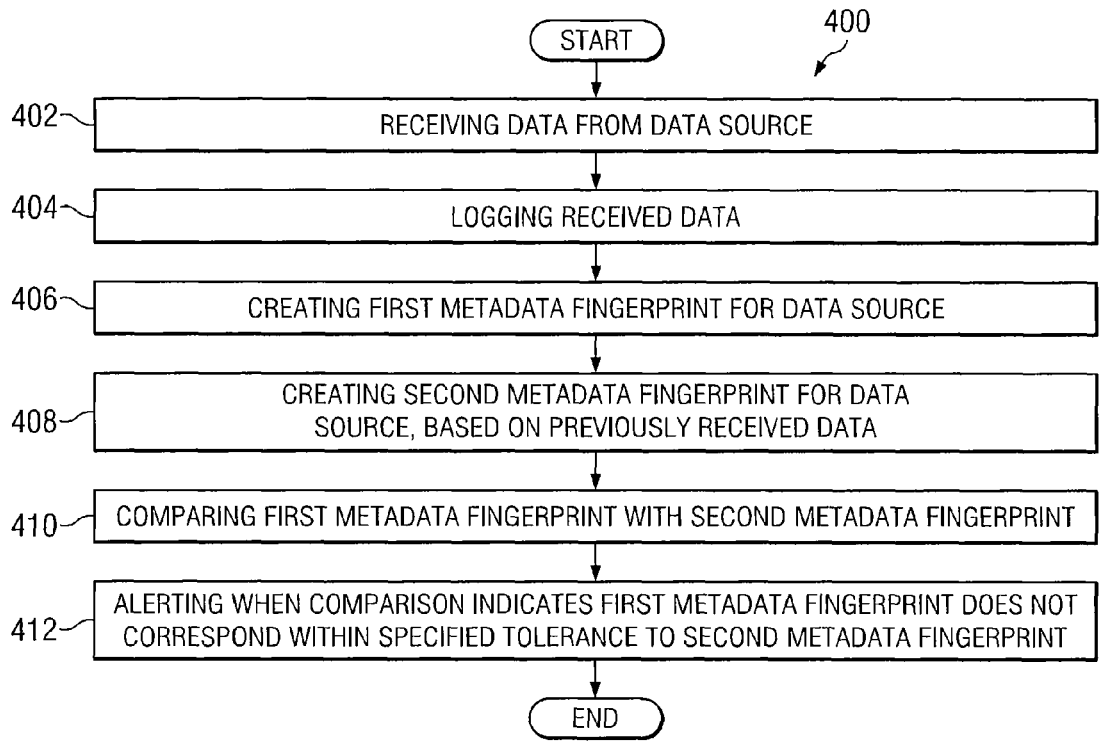
FIG. 4 is a flowchart illustrating an example method for using metadata analysis for monitoring, alerting, and remediation.

As can be understood with respect to system 10, an embodiment of the invention provides a system for using metadata analysis for monitoring, alerting, and remediation of data sources, such as firewalls, computer systems, routers, and storage arrays. The following figures may provide greater insight to those of ordinary skill in the art as to other embodiments of the invention. FIGS. 2A and 2B illustrate a graphical representation of metadata fingerprints. These graphs will provide greater detail about how a particular embodiment of system 10 may analyze the metadata fingerprints. FIG. 3 provides a flowchart illustrating an example method that metadata analysis module 38 may use to create and analyze the metadata fingerprints of FIGS. 2A and 2B. FIG. 4 provides a flowchart illustrating an example method for using metadata analysis for monitoring, alerting, and remediation of systems.

FIG. 2A is a graph 200 illustrating example metadata fingerprints generated by an example of metadata analysis system 14. These metadata fingerprints provide an example of a pictorial representation of the metadata received by metadata analysis system 14. In this example, graph 200 illustrates a metadata fingerprint for four periods of 24 hours. Individual fingerprint graphs 202, 204, 206, and 208 represent a metadata fingerprint generated for a particular 24 hour period.

Horizontal axis of graph 200 may represent any particular period of time. For example, particular periods of time may be an hour, 12 hours, a day, a week, or a month. The vertical axis of graph 200 may represent metadata information about data stored in log file container 24, event log file container 32, and/or annotated log file container 36. Examples of the metadata information may be events per unit time, records per unit time, and/or bytes per unit time.

In the illustrated example for graph 200, the horizontal axis represents time from 00:00 (midnight) to 23:59 (one minute before midnight) for a given day. Fingerprint graph 202 represents a baseline metadata fingerprint. Individual fingerprint graphs 204, 206, and 208 represent a metadata fingerprint for Monday, Tuesday, and Saturday respectively. For simplicity, graph 202 will be referred to as baseline 202, graph 204 as Monday 204, graph 206 as Tuesday 206, and graph 208 as Saturday 208.

Baseline 202 represents a metadata fingerprint that metadata analysis system 14 may use as the basis of comparison to other metadata fingerprints. For example, Monday 204 metadata fingerprint may represent a metadata fingerprint of events per second received form a physical machine on a Monday. Baseline 202 may represent a metadata fingerprint of events per second received from the same physical machine averaged over the last week's weekdays.

Metadata analysis module 38 determines that a tolerance level of 5% is an acceptable variance based on the standard deviation of the previous Monday's data. Although metadata fingerprint Monday 204 does not correspond exactly to baseline 202, metadata analysis module 38 determines that the variance at all times is within the 5% acceptable range. Accordingly metadata analysis module 38 does not create an alert.

Tuesday 206 may represent a metadata fingerprint for Tuesday of the same week. Metadata analysis module 38 may use baseline 202 and tolerance level of 5% for Tuesday 206 in metadata analysis module's 38 analysis. In this example, metadata analysis module 38 determines that at 08:00 (about ⅔ between 00:00 and 12:00) and 21:00 (¾ between 12:00 and 23:59), the variance between baseline 202 and Tuesday 206 exceeds the acceptable variance and generates an alert at both 8:00 and 21:00.

Saturday 208 may represent a metadata fingerprint for Saturday of the same week. It should be apparent from the graph that the fingerprint for Saturday 208 is significantly different than the metadata fingerprint for other days of the week as well as baseline 202. Metadata analysis module 38 may be programmed to respond to this in several ways. In a particular embodiment, metadata analysis module 38 may be programmed to ignore metadata fingerprints for weekend days. In other embodiments, metadata analysis module 38 may compare Saturday 208 to baseline 202. In this particular embodiment, an alert may be generated at 8:00 through 18:00 and again at 21:00 through 23:59. In yet another embodiment, metadata analysis module 38 may compare Saturday 208 to a Saturday baseline (not illustrated) that is generated using the metadata fingerprints from the four previous Saturdays.

FIG. 2B is a graph illustrating particular points of interest from metadata fingerprints baseline 202 and Tuesday 206 from FIG. 2A. For example, points 210, 212, 214, 216 may represent points of interest where metadata analysis module 38 may have created an alert or cancelled an alert.

As previously discussed, the metadata fingerprint Tuesday 206 had unacceptable variances at 8:00 and 21:00. The detection of an unacceptable variance is at point 210. At point 210, metadata analysis module 38 determines that the variance between Tuesday 206 and baseline 202 has exceeded the allowable range and an alert is created. The alert may be logged by annotated log file container 36, with information that references locations within log file container 24 and event log file container 32. An event may also be recorded in event log file container 32. Alert module 40 may also create an alert notification on user system 16. For example, at 8:00, annotation At point 212, metadata analysis module 38 determines that the variance between Tuesday 206 and baseline 202 is now within the allowable tolerance range. Metadata analysis module 38 may notify alert module 40 that the variance has returned to the allowable range. Additionally, metadata analysis module 38 may record an entry in event log file container 32 that indicates the variance has returned to acceptable levels. Alert module 40 may cause the previously created alert notification on user system 16 to be cancelled or add additional information to the previously created alert that the variance has returned to acceptable levels.

At point 214, metadata analysis module 38 again determines that the variance between Tuesday 206 and baseline 202 has exceeded the allowable range. As with point 210, the same steps that metadata analysis module 38 preformed may occur. At point 216, an information technology administrator may have responded to the alert generated by alert module 40. The information technology administrator may use user system 16 to clear the alert and cancel subsequent alerting for a set period of time or until a new variance is detected after the variance returns to acceptable levels.

FIG. 3 is a flowchart illustrating an example method that may be carried out by metadata analysis module 38 in creating and analyzing metadata fingerprints. In the illustrated embodiment, at step 302, a baseline metadata fingerprint is created. At step 304, a comparison metadata fingerprint is created. An analysis between the baseline metadata fingerprint and comparison metadata fingerprint is made at step 306. At step 308, detection of when the baseline metadata fingerprint and comparison metadata fingerprint is outside a specified tolerance is performed. At step 310, the detection that the comparison metadata fingerprint has been detected to be outside a specified tolerance is logged. At step 312, a notification is generated that a detection that the comparison metadata fingerprint has been detected to be outside a specified tolerance. In particular embodiments, method 300 may be performed continuously to provide real time monitoring of data source 12.

In a particular embodiment, at step 302, metadata analysis module 38 may access log file container 24 and/or event log file container 32 to create a baseline metadata fingerprint. Metadata analysis module 38 may be configured to create metadata fingerprints for particular periods of time. For example, metadata fingerprints may be created for a hour, a day, a week, and/or a month. Metadata analysis module 38 may also create metadata fingerprints for specific ranges or days. For example, specific ranges may be, 10-20 days ago, the previous five Saturdays, the previous 10 work days.

Metadata analysis module 38 may also create fingerprints according to various criteria. For example metadata fingerprints may be created according to the number of bytes received per second, a number of records created per minute, the number of events recorded per hour, or other suitable criteria. The baseline fingerprint may use time on the horizontal axis and the criteria on the vertical axis. Additionally, a metadata fingerprint may be created according to a running total of the number of bytes, records, and/or events received up to a particular time of day. For example, at time 00:00 for a particular day, the number of bytes received is set to 0. At 05:00, the total number of bytes received since 00:00 is 10,000; at 10:00 the total number of bytes received since 00:00 may be 50,000.

At step 304, a comparison metadata fingerprint is created. This comparison metadata fingerprint may be created from real time data received from data source 12 for that particular day or for a specific period of time. The comparison metadata fingerprint may use the same axes as the baseline metadata fingerprint. For example, comparison metadata fingerprint may be created as from a real time running tally of bytes received since 00:00. Alternatively, comparison metadata fingerprint may be created from the generated data from a virtual machine over the course of several days or weeks.

At step 306, an analysis is performed between baseline metadata fingerprint and comparison metadata fingerprint. For example, baseline metadata fingerprint may represent the average of several weeks worth of data from a physical machine. Comparison metadata fingerprint may represent the data for a particular day from a virtual machine that is configured to replace the physical machine. In a particular embodiment, baseline metadata fingerprint may be from a first virtual machine and comparison metadata fingerprint may be from a second virtual machine configured to be identical to the first virtual machine.

In a particular embodiment, baseline metadata fingerprint may represent the average of several weeks worth of data from a particular data source for a particular time period. Comparison metadata fingerprint may be generated from real time data from the particular data source for the same time period. For example, baseline metadata fingerprint may be the average number of events per minute logged from the particular data source from 00:00 to 12:00 over the course of the past three weeks. Comparison metadata fingerprint may be the number of events per minute logged from 00:00 to the current time, 12:00, on the particular day method 300 is performed for that particular data source.

At step 308, detection of when the baseline metadata fingerprint and comparison metadata fingerprint is outside a specified tolerance is performed. For example, the specified tolerance may be a set percentage, such as 5%, 10% or 15% above or below the baseline metadata fingerprint. Alternatively, a statistical analysis may be performed if the baseline metadata fingerprint is generated using an average of previous data. The statistical analysis may provide a standard deviation based on the previous data and the specified tolerance may be a number of multiples of the standard deviation, including 1×, 2×, 1.5×, or other multiple.

In a particular embodiment, the tolerance is set to 10%. The value of the baseline metadata fingerprint is 100 events per second. The comparison metadata fingerprint's value at the same instance is 120 events per second. The difference between the value of baseline metadata fingerprint and comparison metadata fingerprint is greater than 10% and a log entry may be created. In another embodiment, the tolerance may be set to 2× the standard deviation. The difference between baseline metadata fingerprint and comparison metadata fingerprint is 1× the standard deviation. No log entry would be generated in such a circumstance.

At step 310, logging that a detection that the comparison metadata fingerprint is outside a specified tolerance of baseline metadata fingerprint is performed. In particular embodiments, metadata analysis module 38 may cause an entry to be created in annotated log file container 36. The entry may indicate the locations in log file container 24 and/or event log file container 32 that correspond to the location in the comparison metadata fingerprint where the detection that the value was outside a specified tolerance occurred. For example, the comparison metadata fingerprint may have a 20% deviation from the baseline metadata fingerprint at 08:00. An entry in annotated log file container 36 may record the line numbers of entries in log file container 24 and/or event log file container 32 that have a time stamp of 08:00.

At step 312, a notification that a detection that the comparison metadata fingerprint is outside a specified tolerance range of the baseline metadata fingerprint has occurred is generated. This notification may be transmitted to alert module 40, which may in turn cause an alert to appear on user system 16. Alternatively alert module 40 may send an email to specific addresses notifying the recipients that a detection has occurred.

FIG. 4 is a flowchart illustrating an example method 400 for using metadata analysis for monitoring, alerting, and remediation. At step 402, data is received from a data source. The data is logged at step 404. A first metadata fingerprint is created from the data source at step 406. A second metadata fingerprint is created using previously received data from a data source at step 408. In certain embodiments, the data for the second metadata fingerprint may be from the same data source. In certain embodiments, data for the second metadata fingerprint may be from a physical or first virtual machine where the first metadata fingerprint is from a second virtual machine that is replacing the physical or first virtual machine.

At step 410 the first and second metadata fingerprints are analyzed. In certain embodiments, the first and second metadata fingerprints are compared such that an alert is generated when the values for any given period of time are outside a specified tolerance range. At step 412, an alert is sent when the values for any given period of time are outside a specified tolerance range.

In a particular embodiment, method 400 may be used to verify a successful virtualization of a physical machine to a virtual machine. Data source 12 may be a physical computer system. Metadata fingerprints may be created on the data received from data source 12. A company decides to use a virtual version of the physical computer system. A particular problem is how to determine whether the virtualization of the computer was done successfully, that is, whether the virtual computer system functions identically to the physical machine. It is expected that if virtualization was successful, metadata fingerprints of the virtual machine will be within tolerances of the metadata fingerprints of the physical machine. Method 400 may be used to detect and remediate problems with virtualization.

In particular embodiments, method 400 may be used to verify and allow uninterrupted monitoring of a virtual machine to another virtual machine. A virtual machine may be a system that services web pages. For example, a company may desire a backup system in the event that a main system is required to be shut down for maintenance or otherwise. This may be commonly referred to as a hot or warm backup system. It is often desired that the backup system operate exactly the same as the main system. Method 400 may also be used in conjunction with virtualizing a physical system to determine if the virtual machine operates similarly to the physical machine. Additionally, metadata monitoring system 14 may detect that a hypervisor transfer occurred from the a virtual machine to a backup virtual machine. Metadata monitoring system 14 may cause the log files associated with the first virtual machine to be concatenated with the log files generated by the data received from the backup virtual machine. A particular advantage of this embodiment is the log files and metadata fingerprints generated from the log files will not show an interruption despite moving from an initial system to a backup system. The virtual machines will be treated as one device despite moving from one instantiation to another.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
    receiving, at a computing device, data from one or more data sources and logging the received data;
    creating, by the computing device, a first metadata fingerprint for a particular one of the one or more data sources from the received data for the particular one of the one or more data sources, the first metadata fingerprint indicative of a first quantity of data output over a first period of time for the particular one of the one or more data sources;
    creating, by the computing device, a second metadata fingerprint for the particular data source from the received data for the particular one of the one or more data sources, the second metadata fingerprint indicative of a second quantity of data output over a second period of time for the particular data source, wherein the second period of time is a different period of time than the first period of time, the second period of time occurring before the first period of time;
    comparing, by the computing device, the first metadata fingerprint with the second metadata fingerprint associated with the particular data source;
    determining, based on the comparison of the first metadata fingerprint with the second metadata fingerprint, that the first quantity of data varies from the second quantity of data by an amount greater than a specified tolerance for any particular time; and
    providing an alert when it is determined that the first quantity of data varies from the second quantity of data by an amount greater than the specified tolerance.

2. The method of claim 1, wherein the first metadata fingerprint is created from real time data from the particular data source for a particular day and the second metadata fingerprint is created using the same temporal range from a different day.

3. The method of claim 1, further comprising:
logging metadata for the particular data source, wherein the metadata comprises one or more of:
events per unit time;
records per unit time; and
bytes per unit time; and
annotating the metadata.

4. The method of claim 3, further comprising:
providing a location in a log file for the particular data source from the annotated metadata.

5. A method, comprising:
receiving, at a computing device, data from a first virtual machine and logging the received data;
creating, by the computing device, a first metadata fingerprint for the first virtual machine, the first metadata fingerprint indicative of a first quantity of data output over a first period of time for the first virtual machine;
creating, by the computing device, a second metadata fingerprint for a data source, the second metadata fingerprint indicative of a second quantity of data output over a second period of time for the data source, wherein the second period of time is a different period of time than the first period of time, the second period of time occurring before the first period of time;
comparing, by the computing device, the first metadata fingerprint with the second metadata fingerprint;
determining, based on the comparison of the first metadata fingerprint with the second metadata fingerprint, that the first quantity of data varies from the second quantity of data by an amount greater than a specified tolerance for any particular time; and
providing an alert when it is determined that the first quantity of data varies from the second quantity of data by an amount greater than the specified tolerance.

6. The method of claim 5, wherein the data source is a physical machine analog of the first virtual machine.

7. The method of claim 5, wherein the data source is a second virtual machine; and
wherein the first virtual machine received a hypervisor transfer from the second virtual machine.

8. The method of claim 7, wherein log files from the second virtual machine are concatenated with corresponding log files from the first virtual machine.

9. Software embodied in a computer-readable medium and when executed by a processor operable to perform operations, comprising:
receiving data from one or more data sources and logging the received data;
creating a first metadata fingerprint for a particular one of the one or more data sources from the received data for the particular one of the one or more data sources, the first metadata fingerprint indicative of a first quantity of data output over a first period of time for the particular one of the one or more data sources;
creating a second metadata fingerprint for the particular data source from the received data for the particular one of the one or more data sources, the second metadata fingerprint indicative of a second quantity of data output over a second period of time for the particular data source, wherein the second period of time is a different point in time than the first period of time, the second period of time occurring before the first period of time;
comparing the first metadata fingerprint with the second metadata fingerprint associated with the particular data source;
determining, based on the comparison of the first metadata fingerprint with the second metadata fingerprint, that the first quantity of data varies from the second quantity of data by an amount greater than a specified tolerance for any particular time; and
providing an alert when it is determined that the first quantity of data varies from the second quantity of data by an amount greater than the specified tolerance.

10. The software of claim 9, wherein the first metadata fingerprint is created from real time data from the particular data source for a particular day and the second metadata fingerprint is created using the same temporal range from a different day.

11. The software of claim 9, further comprising:
logging metadata for the particular data source, wherein the metadata comprises one or more of:
events per unit time;
records per unit time; and
bytes per unit time; and
annotating the metadata.

12. The software of claim 11, further comprising:
providing a location in a log file for the particular data source from the annotated metadata.

13. The software of claim 9, wherein the first metadata fingerprint is from a virtual machine and
the second metadata fingerprint is from a physical machine.

14. The software of claim 9, wherein the first metadata fingerprint is from a first virtual machine and
the second metadata fingerprint is from a second virtual machine; and
wherein the first virtual machine received a hypervisor transfer from the second virtual machine.

15. The software of claim 14, wherein log files from the first virtual machine are concatenated with corresponding log files from the second virtual machine.

16. A system, comprising:
one or more memory modules; and
one or more processing units operable to:
receive data from one or more data sources and log the received data;
create a first metadata fingerprint for a particular one of the one or more data sources from the received data for the particular one of the one or more data sources, the first metadata fingerprint indicative of a first quantity of data output over a first period of time for the particular one of the one or more data sources;
create a second metadata fingerprint for the particular data source from the received data for the particular one of the one or more data sources, the second metadata fingerprint indicative of a second quantity of data output over a second period of time for the particular data source, wherein the second period of time is a different point in time than the first period of time, the second period of time occurring before the first period of time;
compare the first metadata fingerprint with the second metadata fingerprint associated with the particular data source;
determine, based on the comparison of the first metadata fingerprint with the second metadata fingerprint, that the first quantity of data varies from the second quantity of data by an amount greater than a specified tolerance for any particular time; and provide an alert when it is determined that the first quantity of data varies from the second quantity of data by an amount greater than the specified tolerance.

17. The system of claim 16, wherein the first metadata fingerprint is created from real time data from the particular data source for a particular day and the second metadata fingerprint is created using the same temporal range from a different day.

18. The system of claim 16, further comprising:
log metadata for the particular data source, wherein the metadata comprises one or more of:
events per unit time;
records per unit time; and
bytes per unit time; and
annotate the metadata.

19. The system of claim 18, further comprising:
provide a location in a log file for the particular source from the annotated metadata.

20. The system of claim 16, wherein the first metadata fingerprint is from a virtual machine and
the second metadata fingerprint is from a physical machine.

21. The system of claim 16, wherein the first metadata fingerprint is from a first virtual machine and
the second metadata fingerprint is from a second virtual machine; and
wherein the first virtual machine received a hypervisor transfer from the second virtual machine.

22. The system of claim 21, wherein log files from the first virtual machine are concatenated with corresponding log files from the second virtual machine.

* * * * *